US011438664B2

(12) United States Patent
Kumar et al.

(10) Patent No.: US 11,438,664 B2
(45) Date of Patent: Sep. 6, 2022

(54) AUTOMATED CONTENT VIRALITY ENHANCEMENT

(71) Applicant: Rovi Guides, Inc., San Jose, CA (US)

(72) Inventors: Vijay Kumar, Karnataka (IN); Urvashi Verma, Bangalore (IN); Gyanveer Singh, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 239 days.

(21) Appl. No.: 16/526,191

(22) Filed: Jul. 30, 2019

(65) Prior Publication Data

US 2021/0037289 A1  Feb. 4, 2021

(51) Int. Cl.
| | | |
|---|---|---|
| *H04N 21/475* | (2011.01) | |
| *H04N 21/442* | (2011.01) | |
| *H04N 21/4788* | (2011.01) | |
| *H04N 21/431* | (2011.01) | |
| *H04N 21/8355* | (2011.01) | |

(52) U.S. Cl.
CPC ..... *H04N 21/4756* (2013.01); *H04N 21/4312* (2013.01); *H04N 21/44204* (2013.01); *H04N 21/4788* (2013.01); *H04N 21/8355* (2013.01)

(58) Field of Classification Search
None
See application file for complete search history.

(56) References Cited

U.S. PATENT DOCUMENTS

| | | | | |
|---|---|---|---|---|
| 9,304,976 | B1 * | 4/2016 | Cashmore | G06Q 30/0241 |
| 10,104,427 | B1 * | 10/2018 | Zabetian | H04N 21/4788 |
| 2011/0161159 | A1 * | 6/2011 | Tekiela | G06Q 30/0242 |
| | | | | 705/14.41 |
| 2013/0066885 | A1 * | 3/2013 | Komuves | G06Q 50/01 |
| | | | | 707/748 |
| 2017/0055014 | A1 * | 2/2017 | Bou Balust | H04N 21/251 |
| 2019/0080347 | A1 * | 3/2019 | Smith | G06N 5/022 |
| 2019/0197125 | A1 * | 6/2019 | Ma | G06F 16/43 |

* cited by examiner

*Primary Examiner* — Jason K Lin
(74) *Attorney, Agent, or Firm* — Haley Guiliano LLP

(57) ABSTRACT

Systems and methods for enhancing virality for a content item are disclosed herein. A content item is uploaded to a content sharing platform over a communication network. Feedback on the content item is received from the content sharing platform over the communication network. Based on the feedback, a virality score for the content item is determined and a determination is made as to whether the virality score meets a virality criterion. In response to a determination that the virality score does not meet the virality criterion, a virality enhancement technique is selected from a virality enhancement database, the content item is modified by applying the virality enhancement technique to the content item, and the modified content item is uploaded to the content sharing platform over the communication network.

18 Claims, 6 Drawing Sheets

| Virality Factor or Enhancement Technique | Instances of Virality Factor in Content Item | Weight | Weighted Virality Factor |
|---|---|---|---|
| Filter | m | 4 | 4m |
| Genre | n | 3 | 3n |
| Speed Variation | p | 2 | 2p |
| Embedded Background Music | q | 3 | 3q |
| Unexpectedness | u | 7 | 7u |
| Virality Score: | | | 4m+3n+2p+3q+7u |

FIG. 4

AUTOMATED CONTENT VIRALITY ENHANCEMENT

BACKGROUND

The present disclosure relates to the virality of content circulated over a communication network and, more particularly, to systems and related processes for measuring a virality score for an uploaded content item based on feedback and automatically applying one or more virality enhancement techniques to the content item to enhance its virality.

SUMMARY

In some cases, when content such as audio content, video content, audio/video content, image content, textual content (for example, a tweet and/or emoji), or any other type of electronically communicable content, is uploaded to the Internet, it is desirable for the content to become viral, or widely and rapidly circulated, liked, commented on, shared, viewed, or the like among Internet users. Conventionally, when content is generated it remains unknown whether, and to what extent, the content will become viral upon being uploaded to the Internet. Additionally, if a content item fails to become viral after it has been uploaded to the Internet, options for enhancing the virality of the content item are limited and require user involvement.

In view of the foregoing, the present disclosure provides systems and related methods that are able, even before a content item is uploaded to a communication network, to predict whether, and to what extent, the content item is likely to become viral. The systems and methods described herein are also able to automatically measure the virality of the content item after it has been uploaded and selectively apply one or more virality enhancement techniques to the content item to enhance its virality.

In one example, the present disclosure provides a system for enhancing virality for a content item. The system comprises a communication port, a virality enhancement database, and control circuitry. The communication port is coupled to a communication network, such as the Internet. The virality enhancement database is configured to store one or more virality enhancement techniques, such as applying to the content item a filter effect, a genre combination, a speed variation, background music, or a surprise element. The control circuitry is configured to upload a content item, such as a video clip, an audio clip, an image, a tweet, or any other type of content, to a content sharing platform, such as a social media website, via the communication port and the communication network. The control circuitry receives feedback on the content item from the content sharing platform via the communication network and the communication port. Example types of feedback include values for virality feedback metrics, such as numbers of likes, dislikes, shares, comments, or views indicated for the content item by the content sharing platform. Based on the feedback, the control circuitry determines a virality score for the content item and determines whether the virality score meets a virality criterion. Example types of virality criteria include a cumulative number of virality feedback metrics for the content item. In response to determining that the virality score does not meet the virality criterion, the control circuitry selects a virality enhancement technique from the virality enhancement database, modifies the content item by applying the virality enhancement technique to the content item, and uploads the modified content item to the content sharing platform via the communication port and the communication network.

In another example, the control circuitry is configured to determine the virality score for the content item by computing, as the virality score, a cumulative number of likes, dislikes, shares, comments, and views for the content item indicated by the content sharing platform. In another aspect, the control circuitry is configured to determine the virality score for the content item by retrieving respective weights for the plurality of feedback metrics and computing, as the virality score, a weighted combination of the plurality of feedback metrics based on the respective weights.

The control circuitry is configured to select the virality enhancement technique in a variety of ways, in various aspects. For instance, in one example, the control circuitry selects a first virality enhancement technique from the virality enhancement database, predicts a virality score for the content item if the content item were modified based on the first virality enhancement technique, determines whether the predicted virality score meets the virality criterion, and, based on a result of the determination, selects the virality enhancement technique to be used for modifying the content item. For example, in response to determining that the predicted virality score meets the virality criterion, the control circuitry selects the first virality enhancement technique as the virality enhancement technique to be used for the modifying of the content item. In response to determining that the predicted virality score does not meet the virality criterion, the control circuitry selects a second virality enhancement technique from the virality enhancement database as the virality enhancement technique to be used for the modifying of the content item. In some aspects, the control circuitry is configured to predict the virality score for the content item by determining respective numbers of virality factors included in the content item, retrieving respective weights for the virality factors, and computing, as the predicted virality score, a weighted combination of the plurality of virality factors based on the respective weights.

In a further aspect, after the control circuitry has modified the content item, the control circuitry is configured to receive updated feedback on the modified content item from the content sharing platform via the communication network and the communication port. Based on the updated feedback, the control circuitry determines an updated virality score for the modified content item and determines whether the updated virality score meets the virality criterion. In response to determining that the updated virality score does not meet the virality criterion, the control circuitry selects, from the virality enhancement database, an additional virality enhancement technique and applies the additional virality enhancement technique to the modified content item, thereby generating a further modified content item. The control circuitry uploads the further modified content item to the content sharing platform via the communication port and the communication network, and, in some cases, automatically repeats the process until the content item yields a virality score that meets the virality criterion.

BRIEF DESCRIPTION OF THE DRAWINGS

The above and other objects and advantages of the disclosure will be apparent upon consideration of the following detailed description, taken in conjunction with the accompanying drawings, in which:

FIG. 4 depicts an example data structure for virality enhancement database entries, in accordance with some embodiments of the disclosure;

DETAILED DESCRIPTION

Figure 1:
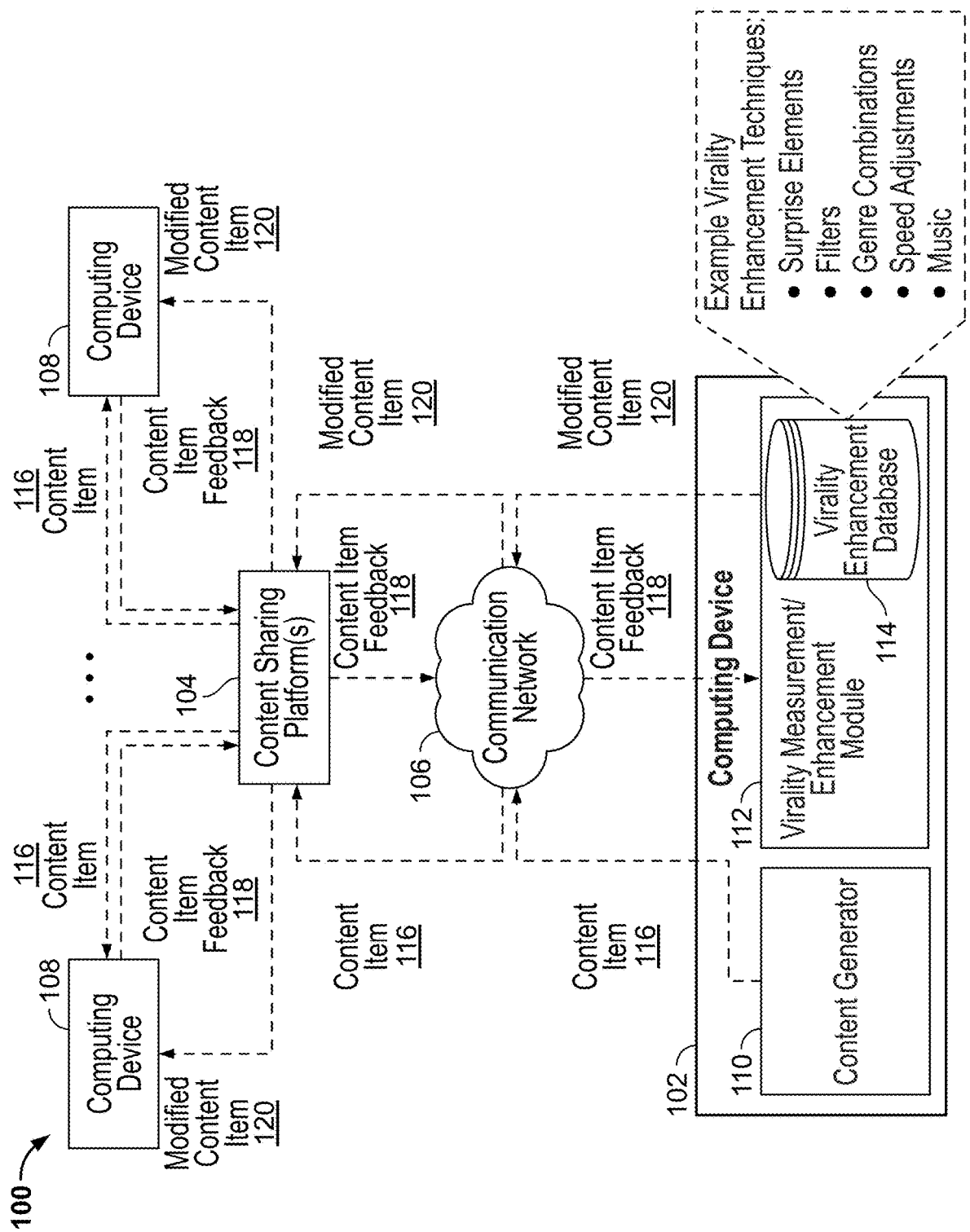
FIG. 1 shows an illustrative block diagram of a system for enhancing virality for a content item, in accordance with some embodiments of the disclosure.

FIG. 1 shows an illustrative block diagram of a system for enhancing virality for a content item, in accordance with some embodiments of the disclosure. Although FIG. 1 shows system 100 as including a number and configuration of individual components, in some embodiments, any number of the components of system 100 may be combined and/or integrated as one device. System 100 includes computing device 102, one or more content sharing platforms 104, computing device(s) 108, and communication network 106. Computing device 102 and computing devices 108 are communicatively coupled to content sharing platform 104 via communication network 106, although FIG. 1 only shows one instance of communication network 106 to avoid overcomplicating the drawing. Communication network 106 may be any type of communication network, such as the Internet, a mobile phone network, a mobile voice or data network (e.g., a 5 G network), a cable network, a public switched telephone network, or any combination of two or more of such communication networks. Communication network 106 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths.

Computing device 102 includes content generator 110 and virality measurement/enhancement module 112, which includes virality enhancement database 114. Content generator 110 is used to generate an item of content, which may be user-generated audio, video, audio/video, image content or any other type of content, which is uploaded (116) to content sharing platform 104 via communication network 106 for access by one or more other users via computing device(s) 108. The users provide (118) feedback on the content item, for instance, by way of likes, dislikes, shares, views, comments, or the like, via content sharing platform 104, which in turn provides (118) the content item feedback to virality measurement/enhancement module 112 via communication network 106. Virality measurement/enhancement module 112 measures a virality score for the content item based on the received content item feedback. If the measured virality score fails to meet a virality criterion, which may be user-configured or system-configured, virality measurement/enhancement module 112 modifies the content item by applying to the content item one or more virality enhancement techniques (which are described in further detail below) automatically selected from virality enhancement database 114. Virality measurement/enhancement module 112 then uploads (120) the modified content item to content sharing platform 104 (for example, replacing the previously uploaded unmodified content item) via communication network 106 for access by one or more other users via computing devices 108. At this point, in some examples, the feedback, measurement, and enhancement cycle repeats until the content item meets the virality criterion. Additional details regarding the features and functionality of system 100 are provided below.

Figure 2:
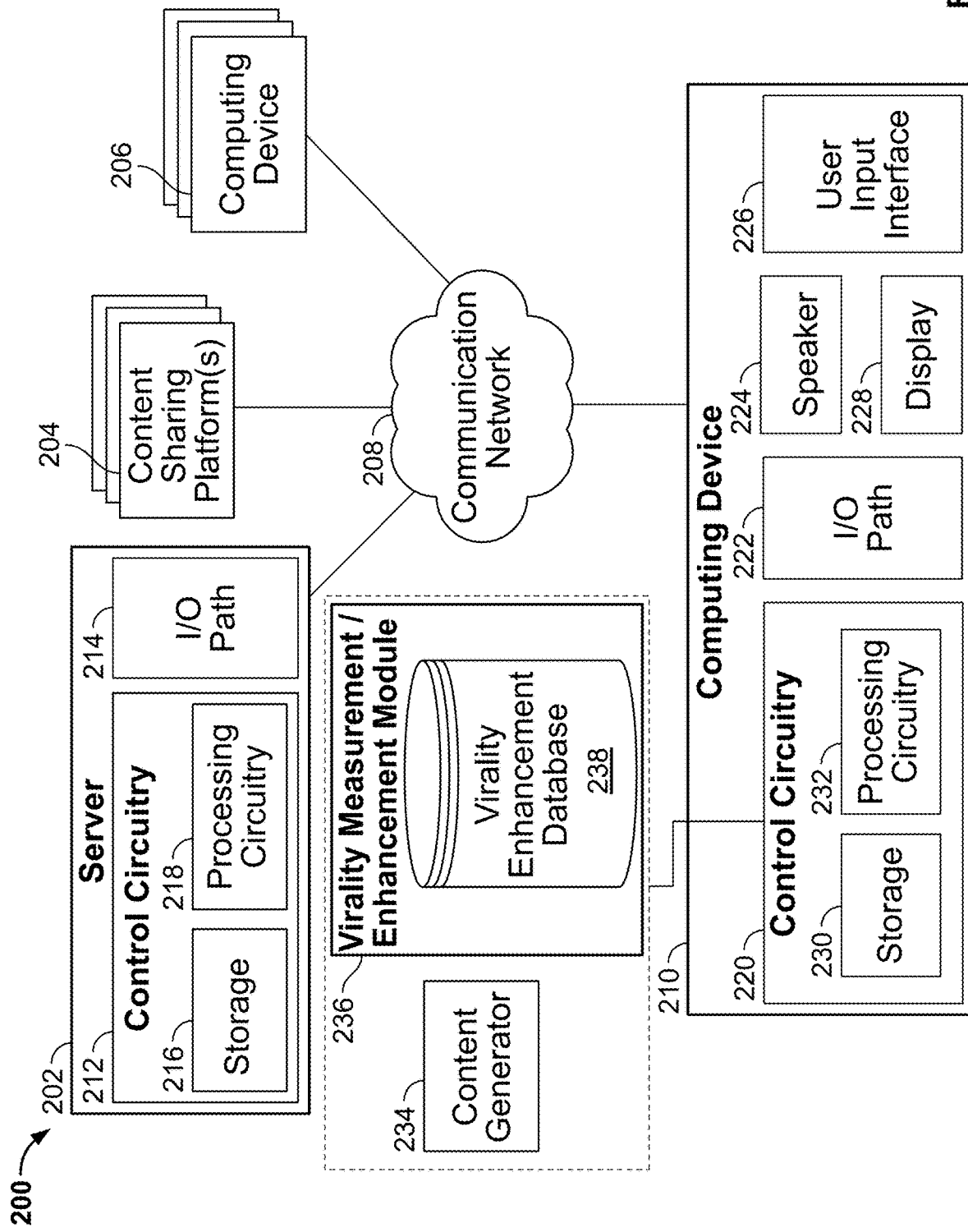
FIG. 2 is an illustrative block diagram showing additional details of the system of FIG. 1, in accordance with some embodiments of the disclosure.

FIG. 2 is an illustrative block diagram showing system 200, which shows additional details of the system 100 of FIG. 1, in accordance with some embodiments of the disclosure. Although FIG. 2 shows certain numbers of components, in various examples, system 200 may include fewer than the illustrated components and/or multiples of one or more illustrated components. System 200 includes server 202, computing device 210, content sharing platform(s) 204, computing device(s) 206, each communicatively coupled to communication network 208, which may be the Internet or any other suitable network or group of networks. In some embodiments, system 200 excludes server 202, and functionality that would otherwise be implemented by server 202 is instead implemented by other components of system 200, such as computing device 210. In still other embodiments, server 202 works in conjunction with computing device 210 to implement certain functionality described herein in a distributed or cooperative manner.

Server 202 includes control circuitry 212 and I/O path 214, and control circuitry 212 includes storage 216 and processing circuitry 218. Computing device 210, which may be a personal computer, a laptop computer, a tablet computer, a smartphone, or any other type of computing device, includes control circuitry 220, I/O path 222, speaker 224, display 228, and user input interface 226. Control circuitry 220 includes storage 230 and processing circuitry 232. Control circuitry 212 and/or 220 may be based on any suitable processing circuitry such as processing circuitry 218 and/or 232. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 220 and/or control circuitry 212 are configured to implement content generator 234, virality measurement/enhancement module 236, and/or virality enhancement database 238, which may further represent content generator 110, virality measurement/enhancement module 112, and virality enhancement database 114 described above in connection with FIG. 1.

Each of storage 216, storage 230, and/or storages of other components of system 200 (e.g., storages of content sharing platform(s) 204, computing devices 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 216, storage 230, and/or storages of other components of system 200 may be used to store various types of content, metadata, and or other types of data. Non-volatile memory may also be used (e.g., to launch a boot-up routine and other instructions). Cloud-based storage may be used to supplement storages 216, 230 or instead of storages 216, 230. In some embodiments, control circuitry 212 and/or 220 executes instructions for an application stored in memory (e.g., storage 216 and/or 230). Specifically, control circuitry 212 and/or 220 may be instructed by the application to perform the functions discussed herein. In some implementations, any action performed by control circuitry 212 and/or 220 may be based on instructions received from the application. For example, the application may be implemented as software or a set of executable instructions that may be stored in storage 216 and/or 230 and executed by control circuitry 212 and/or 220. In some embodiments, the application may be a client/server application where only a client application resides on computing device 210, and a server application resides on server 202.

The application may be implemented using any suitable architecture. For example, it may be a stand-alone application wholly implemented on computing device 210. In such an approach, instructions for the application are stored locally (e.g., in storage 230), and data for use by the application is downloaded on a periodic basis (e.g., from an out-of-band feed, from an Internet resource, or using another suitable approach). Control circuitry 220 may retrieve instructions for the application from storage 230 and process the instructions to perform the functionality described herein. Based on the processed instructions, control circuitry 220 may determine what action to perform when input is received from user input interface 226.

In client/server-based embodiments, control circuitry 220 may include communication circuitry suitable for communicating with an application server (e.g., server 202) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 220 runs a web browser that interprets web pages provided by a remote server (e.g., server 202). For example, the remote server may store the instructions for the application in a storage device. The remote server may process the stored instructions using circuitry (e.g., control circuitry 212) and/or generate displays. Computing device 210 may receive the displays generated by the remote server and may display the content of the displays locally via display 228. This way, the processing of the instructions is performed remotely (e.g., by server 202) while the resulting displays, such as the display windows described elsewhere herein, are provided locally on computing device 210. Computing device 210 may receive inputs from the user via input interface 226 and transmit those inputs to the remote server for processing and generating the corresponding displays.

A user may send instructions (for instance, instructions to generate and/or upload content items to content sharing platform(s) 204 via communication network 208) to control circuitry 212 and/or 220 using user input interface 226. User input interface 226 may be any suitable user interface, such as a remote control, trackball, keypad, keyboard, touchscreen, touchpad, stylus input, joystick, voice recognition interface, a gaming controller, or other user input interfaces. User input interface 226 may be integrated with or combined with display 228, which may be a monitor, a television, a liquid crystal display (LCD), electronic ink display, or any other equipment suitable for displaying visual images.

Server 202 and computing device 210 may transmit and receive content and data via input/output (hereinafter "I/O") path 214 and 222, respectively. For instance, I/O path 222 and/or I/O path 214 may include a communication port configured to upload content items to content sharing platform(s) 204 via communication network 208 and receive feedback on content items from computing devices 206 by way of content sharing platform(s) 204 and communication network 208. Control circuitry 212, 220 may be used to send and receive commands, requests, and other suitable data using I/O paths 214, 222.

Figure 3:
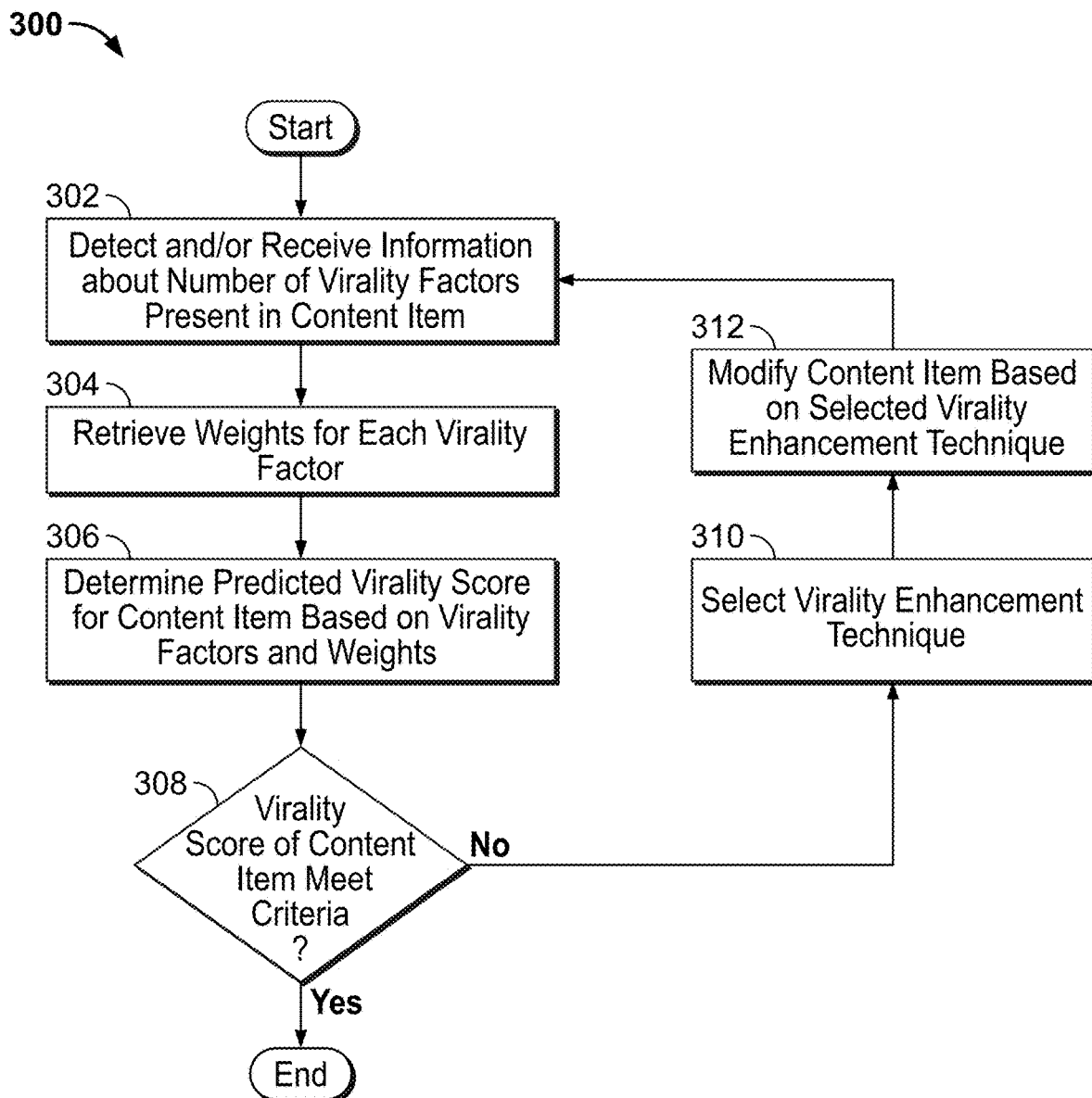
FIG. 3 depicts an illustrative flowchart of a process for predicting a virality score for a content item, in accordance with some embodiments of the disclosure.

Having described systems 100 and 200, reference is now made to FIG. 3, which depicts an illustrative flowchart of process 300 for predicting a virality score for a content item, which may be implemented by using system 100 and/or system 200, in accordance with some embodiments of the disclosure. In various embodiments, individual steps of process 300, or any process described herein, may be implemented by one or more components of system 100 and/or system 200. Although the present disclosure may describe certain steps of process 300 (and of other processes described herein) as being implemented by certain components of system 100 and/or system 200, this is for purposes of illustration only, and it should be understood that other components of system 100 and/or system 200 may implement those steps instead.

At 302, control circuitry 220 detects and/or receives information about a number of virality factors present in a particular content item, which may have been generated by way of content generator 234. At 304, control circuitry 220 retrieves, for example, from virality enhancement database 238, respective weights for the virality factors determined at 302 to be present in the content item. At 306, control circuitry 220 determines a predicted virality score for the content item based on the respective numbers of virality factors determined at 302 and corresponding weights retrieved at 304. FIG. 4 depicts an example data structure 400 for a virality enhancement database entry for a content item, in accordance with some embodiments of the disclosure. Each virality enhancement database entry 400 corresponds to a content item and includes a virality factor or virality enhancement technique 402, a number of instances of the virality factor included in the content item 404, a weight for the virality factor 406, and a weighted virality factor 408, which is determined by multiplying the number of instances of the virality factor in the content item 404 by the weight for the virality factor 406. The virality score 410 is then computed as a weighted combination of the weighted virality factors 408 computed for the content item.

Example types of virality enhancement techniques include introducing a surprise element or an element of unexpectedness; introducing a filter, such as a SNAPCHAT filter; introducing a genre combination; introducing speed variations (e.g., in frames per second); and/or embedding apt/contextual background music. For example, a formal company video-conferencing live meeting may be modified to show an infant suddenly crawling into the video frame as an element of surprise to render the audience awestruck. As another example, a photo of someone's birthday party may be modified to show the presence of a famous and popular celebrity. As yet another example, a filter, such as a beauty filter, a filter that changes looks into funny faces, or the like, may be applied to the content item to introduce a surprise factor that further mesmerizes the audience and improves virality. Alternatively, or in addition, a combination of genres may be incorporated into the content item to entice the audience and improve virality, retaining the suspense and thrill quotient. For instance, a comedy content item may be modified by introducing into the item portions of content from other genres, such as having a sequence of portions of the content item proceed from a comedy genre to a romance genre to an action genre to a comedy genre to a thriller genre to a comedy genre. As still another example, speed variation may be introduced into the content item, such as by combining slow and normal or fast motion (e.g., in frames per second) based on whether a situation in the displayed content is expected to impact the audience's fondness of the content. For instance, a scene in an old movie in which two lovers meet after ten years may be modified to have a mix of slow and normal motion to increase the surprise and suspense element and use that to captivate the audience.

At 308, control circuitry 220 determines whether the predicted virality score determined at 306 meets a virality score criterion, which may be user-configured or system-configured and may be stored in and retrieved from storage 230. If control circuitry 220 determines that the predicted virality score determined at 306 meets the virality score criterion ("Yes" at 308), then process 300 terminates. If, on the other hand, control circuitry 220 determines that the predicted virality score determined at 306 does not meet the virality score criterion ("No" at 308), then at 310 control circuitry 220 selects a virality enhancement technique 310 from virality enhancement database 238. Then, at 312, control circuitry 220 modifies the content item based on the virality enhancement technique selected at 310. Control then passes back to 302 to detect and/or receive information about the number of virality factors present in the content item as modified at 312. Processes 304, 306, and 308 (and 310 and 312, as the case may be) are then repeated for the modified content item until the virality score of the content item meets the virality criterion.

Figure 5:
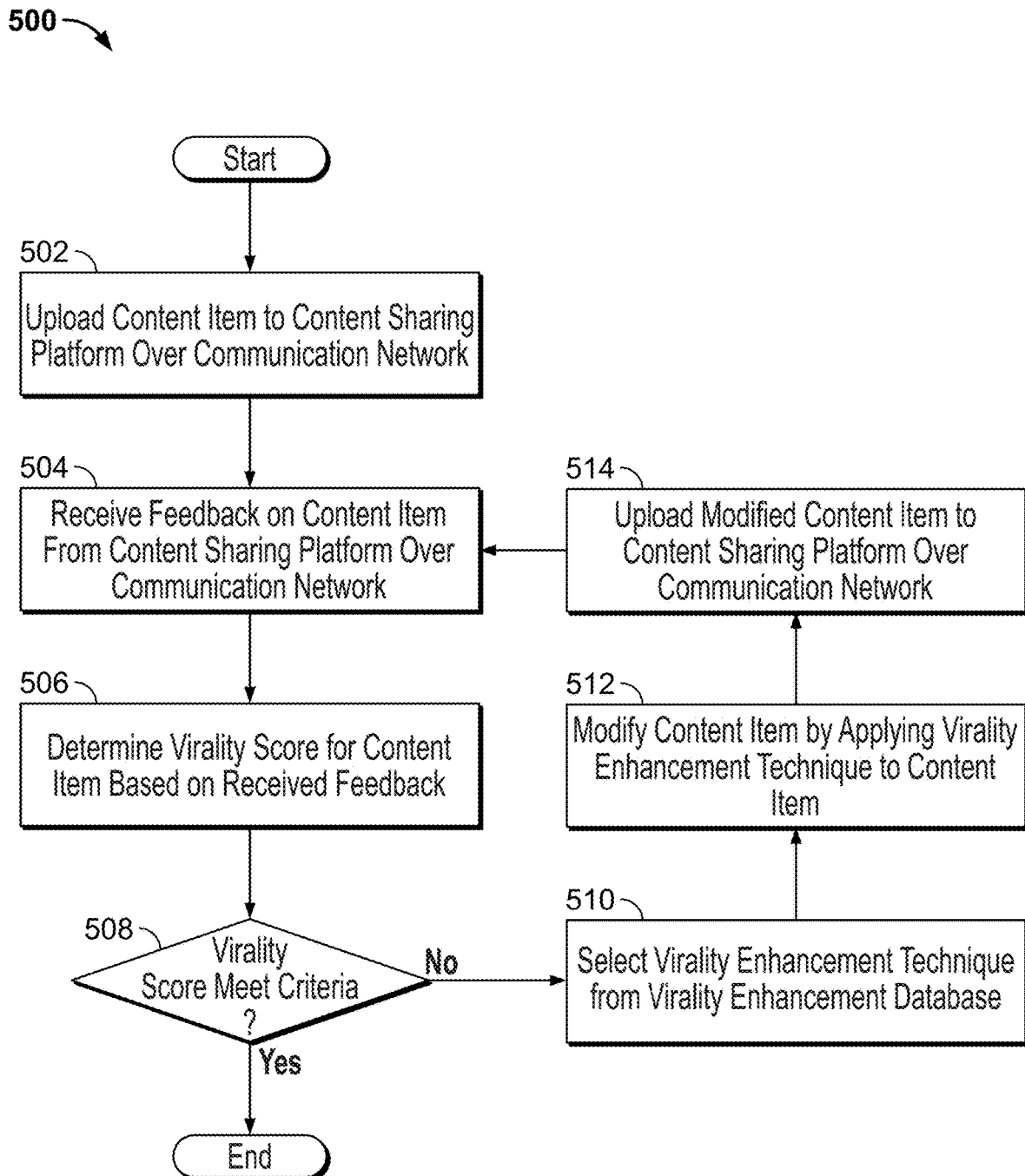
FIG. 5 depicts an illustrative flowchart of a process for enhancing virality for a content item, in accordance with some embodiments of the disclosure.

FIG. 5 depicts an illustrative flowchart of process 500 for enhancing virality for a content item, in accordance with some embodiments of the disclosure. At 502, control circuitry 220 uploads a content item, which may have been generated via content generator 234, to content sharing platform(s) 204 via communication network 208. At 504, control circuitry 220 receives feedback on the content item uploaded at 502 from computing devices 206 by way of content sharing platform(s) 204 and communication network 208. At 506, control circuitry 220 determines a virality score for the content item uploaded at 502 based on the feedback received at 504. In some aspects, the term virality as used herein may have a time-based component to it, such as a. For instance, virality scores as described herein, such as the virality score computed at 506, may be computed based at least in part on a time-based component, such as a rate of change, per unit of time, of a number of likes, dislikes, shares, comments, and/or views indicated for the content item by the content sharing platform, or some other indicator of popularity of the content item.

At 508, control circuitry 220 determines whether the virality score computed at 506 meets a virality criterion, which may be user-configured or system-configured and may be stored in and retrieved from virality measurement/enhancement module 236. If control circuitry 220 determines that the virality score determined at 506 meets the virality score criterion ("Yes" at 508), then process 500 terminates. If, on the other hand, control circuitry 220 determines that the virality score determined at 506 does not meet the virality score criterion ("No" at 508), then at 510 control circuitry 220 selects a virality enhancement technique from virality enhancement database 238. Then, at 512, control circuitry 220 modifies the content item based on the virality enhancement technique selected at 510. At 514, control circuitry 220 uploads the content item, as modified at 512, to content sharing platform(s) 204 via communication network 208, in some cases replacing the content item previously uploaded at 502. Control then passes back to 504 to receive, from computing devices 206 by way of content sharing platform(s) 204 and communication network 208, feedback on the content item as modified at 512 and uploaded at 514. Processes 506 and 508 (and 510 and 512, as the case may be) are then repeated for the modified content item until the virality score of the content item meets the virality criterion.

Figure 6:
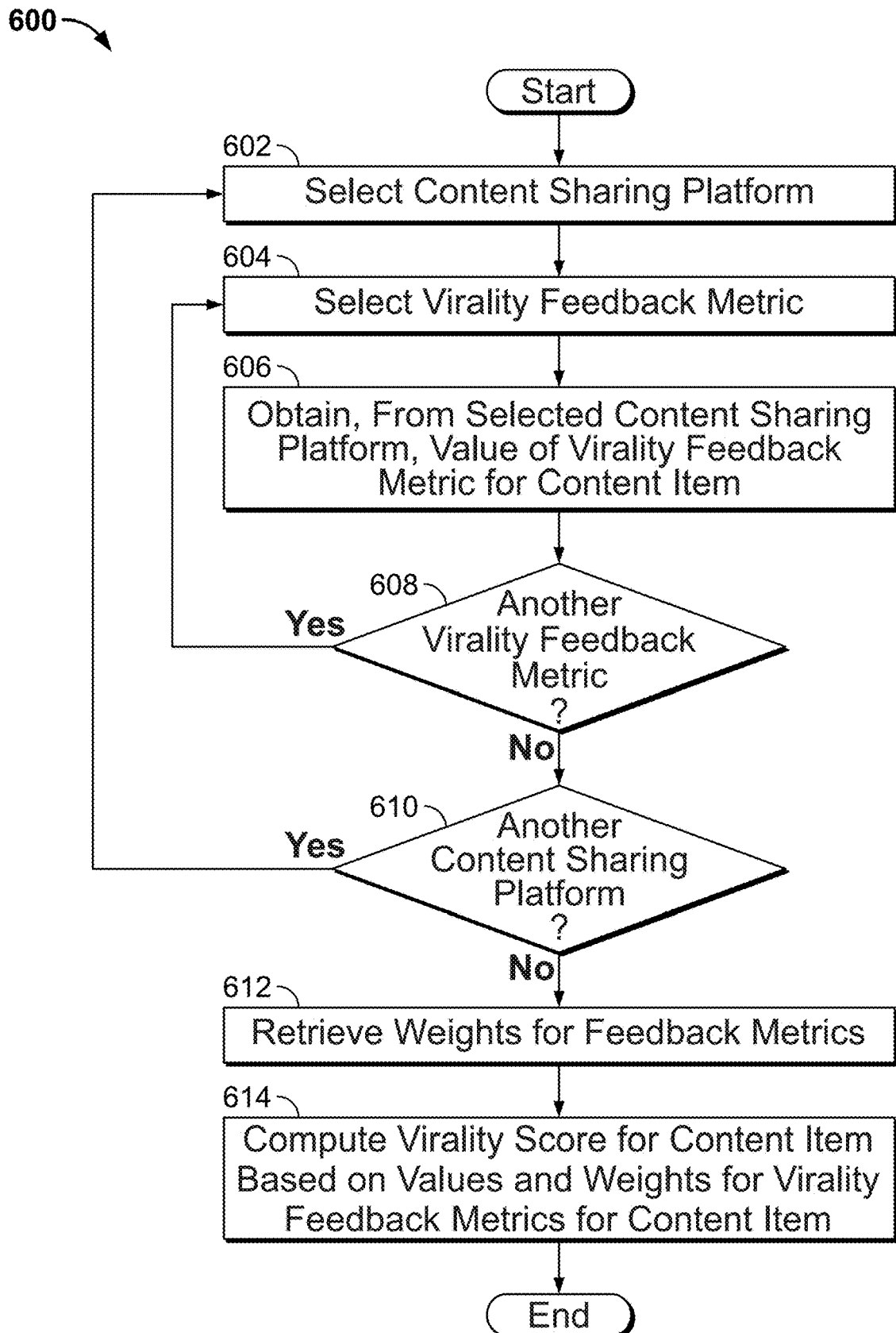
FIG. 6 depicts an illustrative flowchart of a process for determining a virality score for a content item based on feedback, in accordance with some embodiments of the disclosure.

FIG. 6 depicts an illustrative flowchart of process 600 for determining a virality score for a content item based on feedback, in accordance with some embodiments of the disclosure. At 602, control circuitry 220 selects a content sharing platform, for instance, from a list of content sharing platforms stored in virality enhancement database 238. At 604, control circuitry 220 selects a virality feedback metric, for instance, from a list of types of virality feedback metrics stored in virality enhancement database 238. At 606, control circuitry 220 obtains, from the content sharing platform selected at 602, a current value, for a particular uploaded content item, of the virality feedback metric selected at 604.

At 608, control circuitry 220 determines whether another virality feedback metric remains to be analyzed for the content item based on the content sharing platform selected at 602. If another virality feedback metric remains to be analyzed for the content item based on the content sharing platform selected at 602 ("Yes" at 608), then control passes back to 604 to select the additional virality feedback metric for analysis at 606 in the manner described above. If, on the other hand, no other virality feedback metric remains to be analyzed for the content item based on the content sharing platform selected at 602 ("No" at 608), then control passes to 610.

At 610, control circuitry 220 determines whether another content sharing platform remains to be analyzed for the content item. If another content sharing platform remains to be analyzed for the content item ("Yes" at 610), then control passes back to 602 to select the additional content sharing platform for analysis at 604 and 606 in the manner described above. If, on the other hand, no other content sharing platform remains to be analyzed for the content item ("No" at 610), then control passes to 612.

At 612, control circuitry 220 retrieves, for instance, from virality enhancement database 238, respective weights for the virality feedback metrics obtained at each instance of 606.

At 614, control circuitry 220 computes a virality score for the content item based on the values of the virality feedback metrics obtained at each instance of 606 and the corresponding weights retrieved at 612.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for enhancing virality for a content item, the method comprising:
    uploading a content item to a content sharing platform over a communication network;
    receiving feedback on the content item from the content sharing platform over the communication network, wherein the feedback is entered via user accounts on the content sharing platform;
    determining a virality score for the content item based on the feedback;
    determining, based on the feedback, whether the virality score meets a virality criterion; and
    in response to determining that the virality score does not meet the virality criterion:
        selecting, from a virality enhancement database, a virality enhancement technique;
        modifying the content item by applying the virality enhancement technique to the content item; and
        uploading the modified content item to the content sharing platform over the communication network;
    receiving updated feedback on the modified content item from the content sharing platform over the communication network;
    determining an updated virality score for the modified content item based on the updated feedback;
    determining, based on the updated feedback, whether the updated virality score meets the virality criterion; and
    in response to determining that the updated virality score does not meet the virality criterion:
        selecting, from the virality enhancement database, an additional virality enhancement technique;
        applying the additional virality enhancement technique to the modified content item, thereby generating a further modified content item; and
        uploading the further modified content item to the content sharing platform over the communication network.

2. The method of claim 1, wherein the feedback comprises respective values for a plurality of virality feedback metrics indicated for the content item by the content sharing platform, and wherein the values for the plurality of virality feedback metrics comprise at least one of a number of likes, dislikes, shares, comments, or views for the content item indicated by the content sharing platform.

3. The method of claim 2, wherein determining the virality score for the content item comprises computing, as the virality score, a cumulative number of likes, dislikes, shares, comments, and views for the content item indicated by the content sharing platform.

4. The method of claim 2, wherein determining the virality score for the content item comprises:
    retrieving respective weights for the plurality of feedback metrics; and
    computing, as the virality score, a weighted combination of the plurality of feedback metrics based on the respective weights.

5. The method of claim 1, wherein the virality criterion comprises a cumulative number of virality feedback metrics for the content item.

6. The method of claim 1, wherein selecting the virality enhancement technique comprises:
    selecting a first virality enhancement technique from the virality enhancement database;
    predicting a virality score for the content item if the content item were modified based on the first virality enhancement technique;
    determining whether the predicted virality score meets the virality criterion; and
    in response to determining that the predicted virality score does not meet the virality criterion, selecting a second virality enhancement technique from the virality enhancement database as the virality enhancement technique to be used for the modifying of the content item.

7. The method of claim 1, wherein selecting the virality enhancement technique comprises:
    selecting a first virality enhancement technique from the virality enhancement database;
    predicting a virality score for the content item if the content item were modified based on the first virality enhancement technique;
    determining whether the predicted virality score meets the virality criterion; and
    in response to determining that the predicted virality score meets the virality criterion, selecting the first virality enhancement technique as the virality enhancement technique to be used for the modifying of the content item.

8. The method of claim 7, wherein the predicting the virality score for the content item comprises:
    determining respective numbers of a plurality of virality factors included in the content item;
    retrieving respective weights for the plurality of virality factors; and computing, as the predicted virality score, a weighted combination of the plurality of virality factors based on the respective weights.

9. The method of claim 1, wherein the virality enhancement technique comprises applying to the content item a filter effect, a genre combination, a speed variation, background music, or a surprise element.

10. A system for enhancing virality for a content item, the system comprising:
    a communication port coupled to a communication network;
    a virality enhancement database configured to store one or more virality enhancement techniques; and control circuitry configured to:
upload a content item to a content sharing platform via the communication port and the communication network;
receive feedback on the content item from the content sharing platform via the communication network and the communication port, wherein the feedback is entered via user accounts on the content sharing platform;
determine a virality score for the content item based on the feedback;
determine, based on the feedback, whether the virality score meets a virality criterion; and
in response to determining that the virality score does not meet the virality criterion:
select a virality enhancement technique from the virality enhancement database;
modify the content item by applying the virality enhancement technique to the content item; and
upload the modified content item to the content sharing platform via the communication port and the communication network;
receive updated feedback on the modified content item from the content sharing platform via the communication network and the communication port;
determine an updated virality score for the modified content item based on the updated feedback;
determine, based on the updated feedback, whether the updated virality score meets the virality criterion; and
in response to determining that the updated virality score does not meet the virality criterion:
select, from the virality enhancement database, an additional virality enhancement technique;
apply the additional virality enhancement technique to the modified content item, thereby generating a further modified content item; and
upload the further modified content item to the content sharing platform via the communication port and the communication network.

11. The system of claim 10, wherein the feedback comprises respective values for a plurality of virality feedback metrics indicated for the content item by the content sharing platform, and wherein the values for the plurality of virality feedback metrics comprise at least one of a number of likes, dislikes, shares, comments, or views for the content item indicated by the content sharing platform.

12. The system of claim 11, wherein the control circuitry is configured to determine the virality score for the content item by computing, as the virality score, a cumulative number of likes, dislikes, shares, comments, and views for the content item indicated by the content sharing platform.

13. The system of claim 11, wherein the control circuitry is configured to determine the virality score for the content item by:

retrieving respective weights for the plurality of feedback metrics; and
computing, as the virality score, a weighted combination of the plurality of feedback metrics based on the respective weights.

14. The system of claim 10, wherein the virality criterion comprises a cumulative number of virality feedback metrics for the content item.

15. The system of claim 10, wherein the control circuitry is configured to select the virality enhancement technique by:
selecting a first virality enhancement technique from the virality enhancement database;
predicting a virality score for the content item if the content item were modified based on the first virality enhancement technique;
determining whether the predicted virality score meets the virality criterion; and
in response to determining that the predicted virality score does not meet the virality criterion, selecting a second virality enhancement technique from the virality enhancement database as the virality enhancement technique to be used for the modifying of the content item.

16. The system of claim 10, wherein the control circuitry is configured to select the virality enhancement technique by:
selecting a first virality enhancement technique from the virality enhancement database; predicting a virality score for the content item if the content item were modified based on the
first virality enhancement technique;
determining whether the predicted virality score meets the virality first virality criterion; and
in response to determining that the predicted virality score meets the virality criterion, selecting the first virality enhancement technique as the virality enhancement technique to be used for the modifying of the content item.

17. The system of claim 16, wherein the control circuitry is configured to predict the virality score for the content item by:
determining respective numbers of a plurality of virality factors included in the content item;
retrieving respective weights for the plurality of virality factors; and computing, as the predicted virality score, a weighted combination of the plurality of virality factors based on the respective weights.

18. The system of claim 10, wherein the virality enhancement technique comprises applying to the content item a filter effect, a genre combination, a speed variation, background music, or a surprise element.

* * * * *